(12) United States Patent
Sasaki et al.

(10) Patent No.: US 9,025,936 B2
(45) Date of Patent: May 5, 2015

(54) VIDEO PROCESSING APPARATUS, METHOD OF ADDING TIME CODE, AND METHODE OF PREPARING EDITING LIST

(75) Inventors: Hiroshi Sasaki, Tokyo (JP); Hiroo Takagi, Kanagawa (JP); Toru Iwama, Kanagawa (JP); Naomi Egashira, Tokyo (JP)

(73) Assignee: Sony Corporation, Tokyo (JP)

( * ) Notice: Subject to any disclaimer, the term of this patent is extended or adjusted under 35 U.S.C. 154(b) by 1723 days.

(21) Appl. No.: 11/705,230

(22) Filed: Feb. 12, 2007

(65) Prior Publication Data

US 2007/0188627 A1 Aug. 16, 2007

(30) Foreign Application Priority Data

Feb. 14, 2006 (JP) ................. P2006-036845

(51) Int. Cl.
| | |
|---|---|
| H04N 5/93 | (2006.01) |
| H04N 5/268 | (2006.01) |
| G11B 27/034 | (2006.01) |
| G11B 27/10 | (2006.01) |
| G11B 27/30 | (2006.01) |
| G11B 27/32 | (2006.01) |

(52) U.S. Cl.
CPC .............. *H04N 5/268* (2013.01); *G11B 27/034* (2013.01); *G11B 27/10* (2013.01); *G11B 27/3036* (2013.01); *G11B 27/323* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 4,167,759 | A * | 9/1979 | Tachi ............................ | 386/278 |
| 5,892,552 | A * | 4/1999 | Kim ............................. | 348/478 |
| 6,493,362 | B1 * | 12/2002 | Inazumi ........................ | 370/537 |
| 7,324,743 | B2 * | 1/2008 | Hosoda ........................ | 386/239 |
| 2001/0005218 | A1 * | 6/2001 | Gloudemans et al. ........ | 348/157 |
| 2004/0001106 | A1 * | 1/2004 | Deutscher et al. ............ | 345/838 |
| 2004/0100487 | A1 * | 5/2004 | Mori et al. .................... | 345/724 |
| 2004/0179816 | A1 * | 9/2004 | Takehana ........................ | 386/52 |

FOREIGN PATENT DOCUMENTS

JP 9 186959 7/1997

* cited by examiner

*Primary Examiner* — Heather Jones
(74) *Attorney, Agent, or Firm* — Frommer Lawrence & Haug LLP; William S. Frommer; Ellen Marcie Emas

(57) ABSTRACT

A video processing apparatus is provided. The video processing apparatus includes: an inputter inputting video signals of a plurality of systems, and a processor generating processed video signals by performing switching on the video signals of two or more systems input into the inputter. Further, the video processing apparatus includes: a time code generator generating a time code, and a time code adder adding the time code to the input video signals and the generated video signals respectively, outputs the video signals with the time code to be recorded in a recording medium.

12 Claims, 6 Drawing Sheets

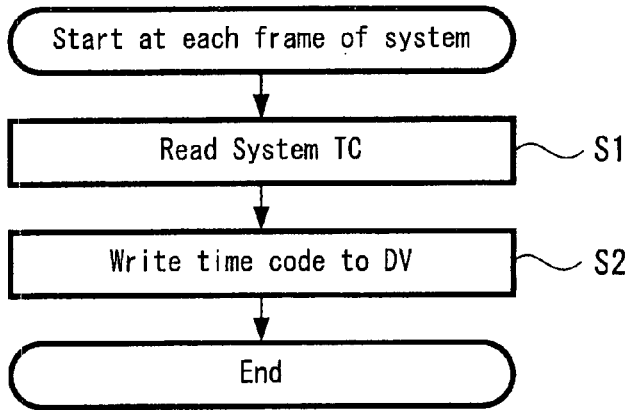
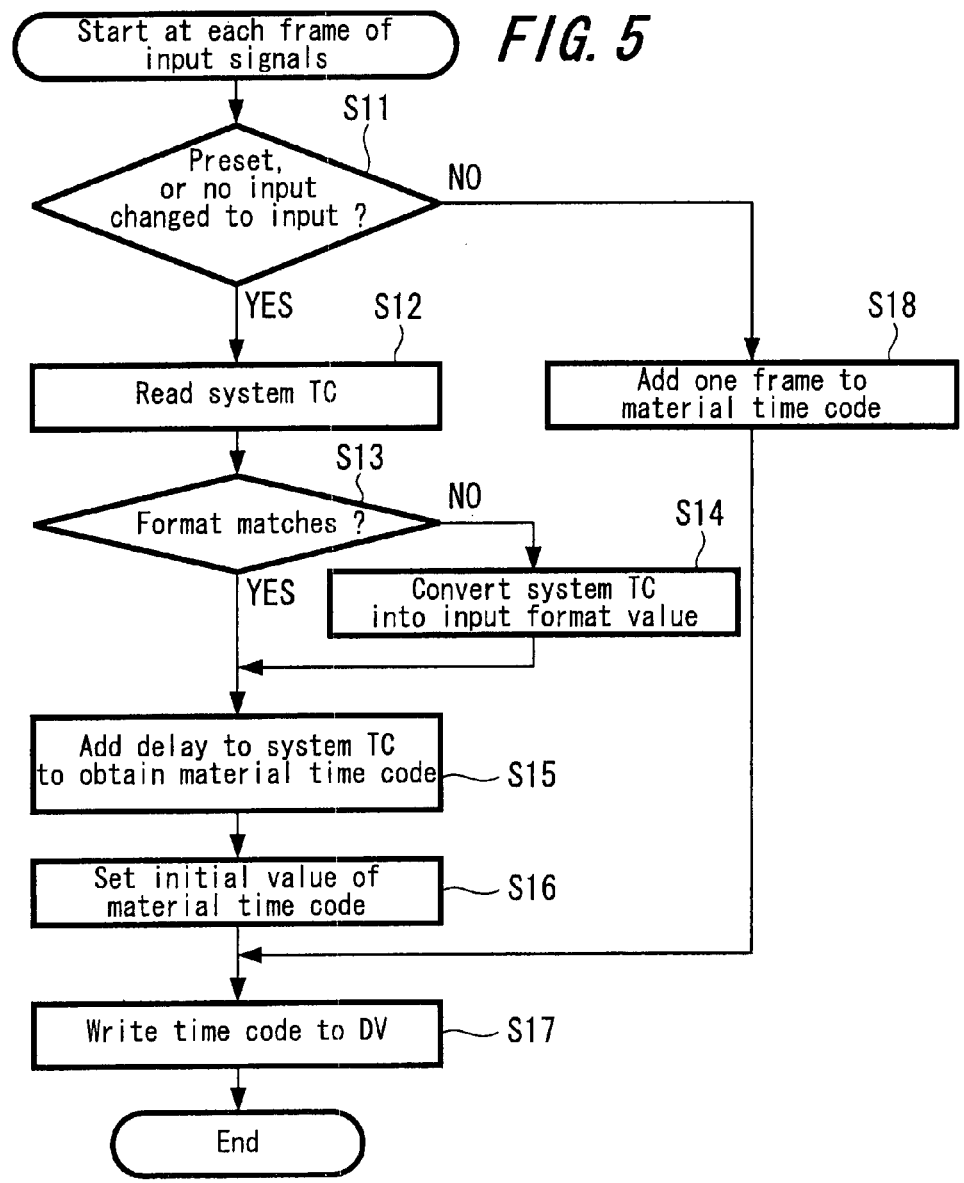

VIDEO PROCESSING APPARATUS, METHOD OF ADDING TIME CODE, AND METHODE OF PREPARING EDITING LIST

CROSS REFERENCES TO RELATED APPLICATIONS

The present invention contains subject matter related to Japanese Patent Application JP 2006-036845 filed in the Japanese Patent Office on Feb. 14, 2006, the entire contents of which being incorporated herein by reference.

BACKGROUND OF THE INVENTION

1. Field of the Invention

The present invention relates to an apparatus inputting video signals of a plurality of systems, processing the input video signals of two or more systems, and generating processed video signals. Particularly, the present invention relates to an apparatus in which mutually synchronous time codes are added to respective input video signals and generated video signals without inputting time codes from the outside.

2. Description of the Related Art

When video contents are created by editing video signals, video signals of a plurality of systems (video signals output from video cameras, VTRs and the like) in general are input into editing equipment, where in-points and out-points of respective input video signals are designated based on a time code. Therefore, it is necessary for the input video signals of a plurality of systems to be supplied with mutually synchronous time codes.

In the past, one of the following methods [1] to [3] was adopted in order to add such mutually synchronous time codes to the input video signals of a plurality of systems.

[1] A method of setting video cameras and other apparatuses in external TC (Time Code) modes, and distributing a time code output from one time code generator to those apparatuses, thereby outputting the common time code from the video cameras, VTRs, and the like.

[2] A method of setting video cameras and other apparatuses in external TC modes, distributing a time code output from one time code generator to those apparatuses, and afterward, switching the external modes to internal modes in those apparatuses to freely run, thereby outputting respective time codes from the video cameras and the like.

[3] A method of setting video cameras and other apparatuses in internal modes, and presetting (or resetting) time code values in those apparatuses by using one remote controller, thereby outputting respective time codes from the video cameras and the like.

In addition, Japanese Unexamined Patent Application Publication No. H09-186959 (paragraphs [0029] through [0032], and FIG. 1)) discloses a technology relating to the generation of a time code in a camcorder. Specifically, a plurality of camcorders, for example, generate time codes synchronous with time codes respectively transmitted from corresponding camera control units, record the generated time codes along with video signals, and transmit the time codes recorded with the video signals to the corresponding camera control units respectively.

SUMMARY OF THE INVENTION

The above-described methods [1] through [3] and the technology disclosed in Japanese Unexamined Patent Application Publication No. H09-186959 may be applied to video cameras and other apparatuses having functions of outputting time codes. Television broadcasting stations, for example, use video cameras and other apparatuses for professional use having such functions, and therefore, use the above-described methods [1] through [3] and add mutually synchronous time codes to input video signals of a plurality of systems, thereby editing video signals.

However, video signals may need to be edited also in other fields than broadcasting. For example, business organizations and the like may record events, conferences, seminars thereof using a plurality of video cameras, and afterward edit video signals to create video contents providing brief overviews of such events and so on.

Here, business organizations and the like typically use video cameras for general consumer use, instead of those for professional use, not including a time code output function, and record such events and the like. The above-described methods [1] through [3] may not be applied to such cases.

Further, there has been known another method of creating video contents providing brief overviews of such events and the like. According to this method, video signals (materials) from respective video cameras are input into a video switcher at the site, where the event and the like are held, to generate the video signals with such effects as dissolves and wipes (called PMG (program) signals), and the materials are later edited by adjusting switching timing on the PGM signals, instead of editing the materials from scratch.

However, it is desirable to add mutually synchronous time codes to video signals input into the video switcher, and also to add time codes mutually synchronous with the input video signals to the PGM signals in order to efficiently edit using the above-described method. In the past, it was difficult to obtain such technology that mutually synchronous time codes were added to video signals input into a video switcher and to PGM signals generated in the video switcher without inputting the time codes from the outside to the video switcher.

There is a need for a video processing apparatus such as the above-described video switcher, inputting video signals of a plurality of systems, processing the input video signals of two or more systems to generate processed video signals, and adding mutually synchronous time codes to the input video signals and the generated video signals, without inputting the time codes from the outside.

According to an embodiment of the present invention, there is provided a video processing apparatus configured to have an inputter, a processor, a time code generator and a time code adder. The inputter inputs video signals of a plurality of systems. The processor processes the video signals of two or more systems input into the inputter, and generates processed video signals. The time code generator generates a time code, and the time code adder adds the time code generated by the time code generator to the processed video signals generated by the processor, and adds the time code, which is obtained by adding a value corresponding to processing delay time at the processor to a value of the time code generated by the time code generator, to the video signals input into the inputter.

Further, according to an embodiment of the present invention, there is provided a method of adding a time code. The method includes the steps of: inputting video signals of a plurality of systems; processing the input video signals of two or more systems and generating processed video signals; generating a time code; adding the generated time code to the processed video signals and adding the time code, which is obtained by adding a value corresponding to processing delay time due to the processing to a value of the generated time code, to the input video signals.

Further, according to an embodiment of the present invention, there is provided a method of preparing an editing list. The method includes the steps of: inputting video signals of a plurality of systems; processing the input video signals of two or more systems and generating processed video signals; generating a time code; adding the generated time code to the processed video signals, and adding the time code, which is obtained by adding a value corresponding to processing delay time due to the processing to a value of the generated time code, to the input video signals; instructing operation on the processing; and preparing an editing list representing information indicating contents of the operation using the generated time code as time information.

According to a main embodiment of the present invention, a video processing apparatus includes: an inputter inputting video signals of a plurality of systems, and a processor processing the video signals of two or more systems input into the inputter and generating processed video signals. Time codes are generated by a single time code generator that is provided in the apparatus. Further, the time code generated by the time code generator is added to the processed video signals generated by the processor and, on the other hand, the time code, which is obtained by adding a value corresponding to the processing delay time at the processor to the time code, is added to the video signals input into the inputter. The video signals with the time code added as described above are output from the video processing apparatus and recorded in a recording medium.

As described above, the time code generated by the single time code generator in the video processing apparatus is added without any change to the processed video signals generated by the processor, and the time code is added to the input video signals in consideration of the processing delay time at the processor. Accordingly, the mutually synchronous time codes can be added to respective input video signals and generated video signals without inputting the time codes from outside of the video processing apparatus.

According to embodiments of the present invention, the mutually synchronous time codes can be added to respective input video signals and generated video signals without inputting the time codes from outside of the video processing apparatus inputting the video signals of a plurality of systems and processing the input video signals of two or more systems to generate the processed video signals.

BRIEF DESCRIPTION OF THE DRAWINGS

FIG. 4 is a flow chart showing time code processing performed by a TC adding unit in an input unit of the video switcher shown in FIG. 1;

FIG. 5 is a flow chart showing the time code processing performed by the TC adding unit in the input unit of the video switcher shown in FIG. 1;

DESCRIPTION OF THE PREFERRED EMBODIMENTS

A video switcher according to an embodiment of the present invention is hereinafter described specifically with reference to accompanied drawings.

[Example of Video Switcher in Use to Which Embodiments of the Present Invention are Applied]

Figure 1:
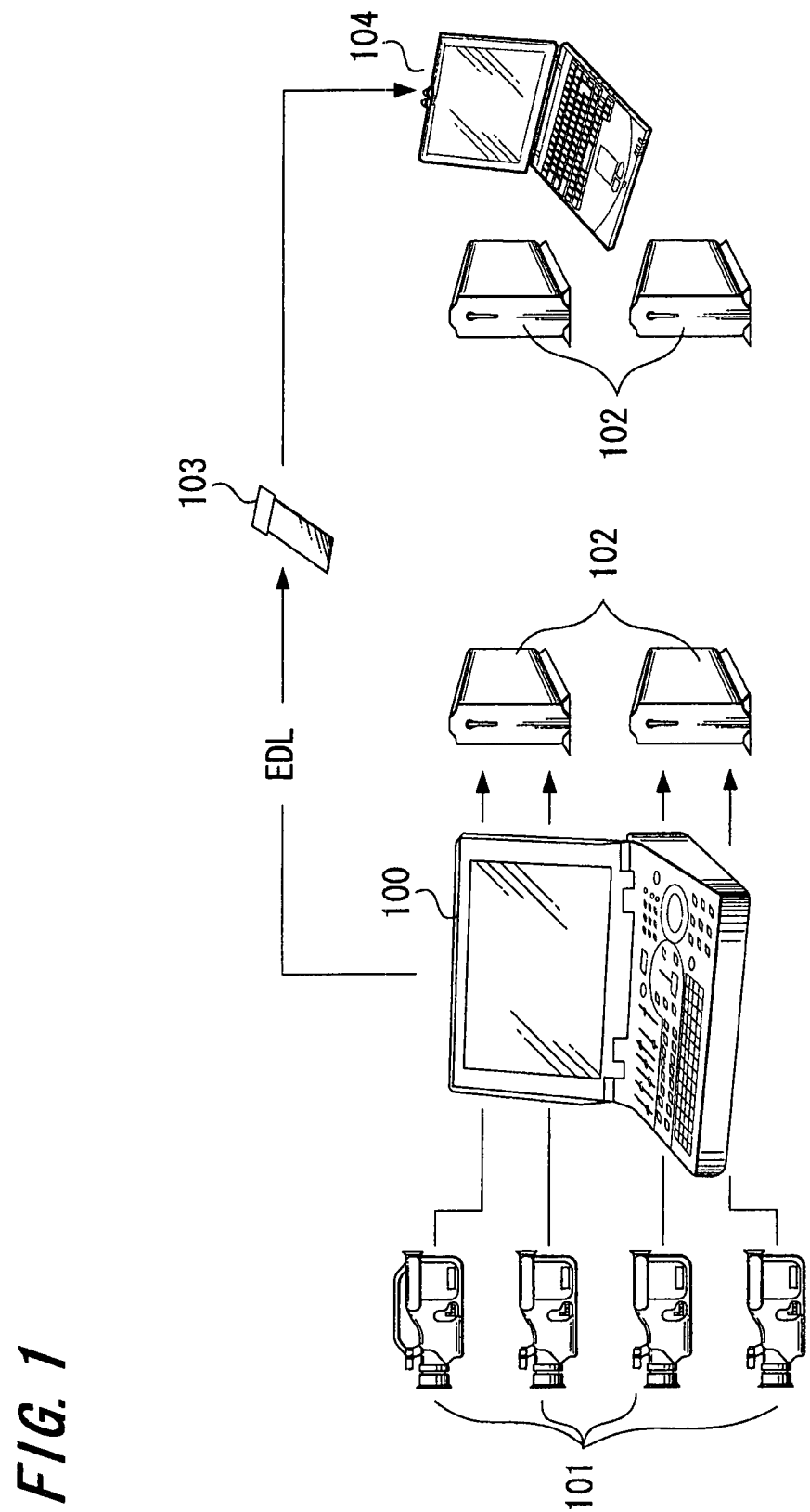
FIG. 1 is a diagram showing an example of a video switcher in use to which an embodiment of the present invention is applied.

FIG. 1 shows an example of a video switcher in use according to an embodiment of the present invention. A video switcher 100 has a shape and size similar to a portable computer and is brought to events, conferences, seminars and the like to be used, for example.

A plurality of video cameras (video cameras for general consumer use without a time code output function) 101 are used on site for recording the event and the like, and video signals (materials) not genlocked and output from the video cameras 101 are input into the video switcher 100. Subsequently, the video switcher 100 is operated to generate video signals (PGM signals) with such effects as dissolves, wipes and the like performed thereon.

The PGM signals generated in the video switcher 100 are used to display images on an image display device with a large screen (not illustrated) set on the site, for example. In addition, the materials input into the video switcher 100 are recorded in HDD (Hard Disk Drive) 102 connected to the video switcher 100.

Further, the video switcher 100 generates an EDL (described later in detail) that represents information indicating contents of switching operation when generating the PGM signals. The generated EDL is recorded in a recording device 103 such as a small memory card inserted in a slot provided to the video switcher 100.

It should be noted that the video switcher 100 also has a function of serving as an audio mixer, but processing on audio signals is not directly related to embodiments of the present invention and therefore is not herein described.

When a non-linear editing apparatus 104 is later used to prepare video contents providing brief overviews of the events and the like, the EDT, in the recording device 103 is used to edit materials recorded in the HDD 102.

[Configuration of Video Switcher to Which Embodiments of the Present Invention are Applied]

Figure 2:
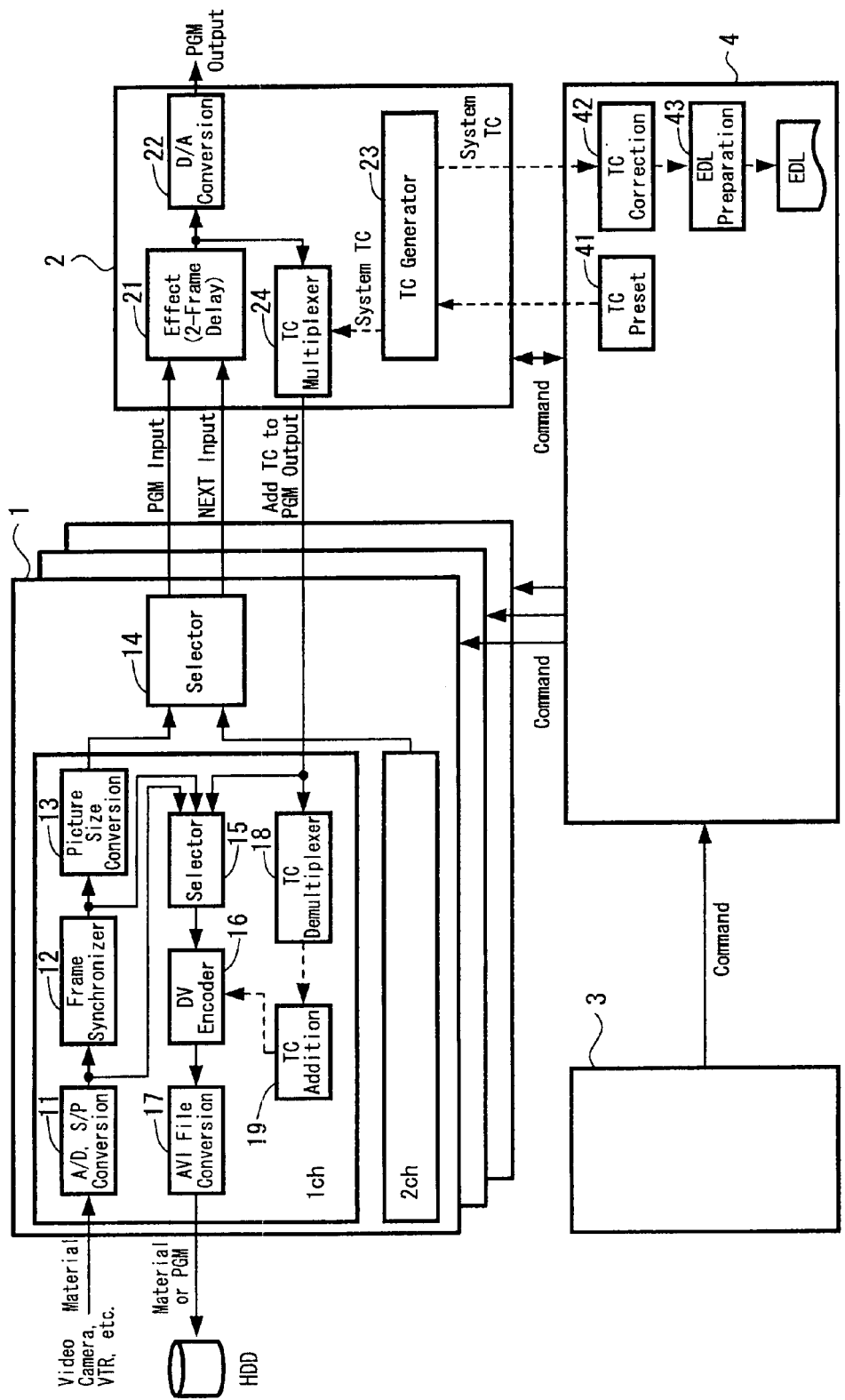
FIG. 2 is a block diagram showing a configuration of main units of a video switcher to which an embodiment of the present invention is applied.

FIG. 2 shows configuration of main units of the video switcher 100. The video switcher 100 is configured to have input units 1 of three systems, effect unit 2, panel unit 3 and main control unit 4. Although not illustrated, CPUs are provided for those units respectively and commands are sent and received among those CPUs.

Each of the input units 1 includes video input terminals (not illustrated) to input video signals by two channels from video cameras, VTRs, and the like (video cameras 101 in FIG. 1). The video switcher 100, on the other hand, does not include a terminal to input a time code.

Each input unit 1 includes an A/D and S/P conversion circuit 11, frame synchronizer 12, picture size conversion circuit 13, selector 15, DV encoder 16, AVI file conversion unit 17, TC (Time Code) demultiplexer 18 and TC adding unit 19, which are provided for each of the channels. Although the AVI file conversion unit 17 and TC adding unit 19 in this configuration are obtained as software processing steps with the CPU in the input unit 1 instead of hardware circuits, those units are illustrated as one processing block in this figure.

In addition, the input unit 1 includes a selector 14 to select a PGM input (Foreground) representing video before switching and a NEXT input (Background) representing video after switching from the input video signals of two channels.

The effect unit 2 includes an effect circuit 21, D/A conversion circuit 22, TC (Time Code) generator 23, and TC multiplexer 24. The effect circuit 21 performs switching processing (such as cutting that represents simple switching, and switching with video effects, for example, dissolves, wipes and the like) on the supplied PGM input (video before switching) and NEXT input (video after switching) to generate processed video signals (PGM signals). Delay time in the effect circuit 21 (processing delay time from the supply of the PGM input and NEXT input to the output of the PGM signals) is equivalent to two frames.

The panel unit 3 is an operation unit for a user to previously perform various settings to operate the video switcher 100, and to supply various instructions to operate the video switcher 100.

Figure 3:
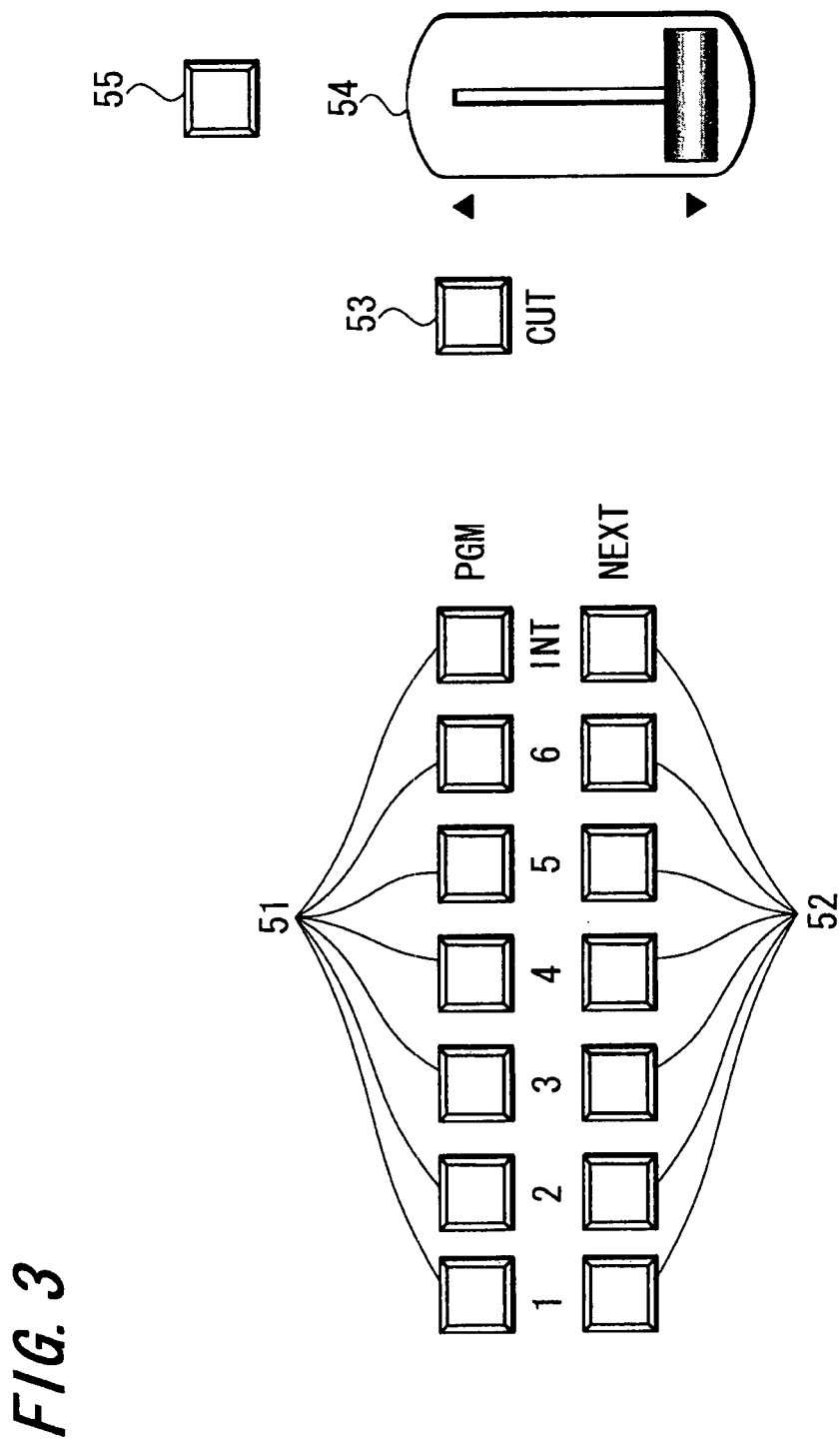
FIG. 3 is a diagram showing buttons and the like provided to a panel unit of the video switcher shown in FIG. 1.

FIG. 3 shows buttons and a lever that are provided in the panel unit 3 to give instructions to switch between video signals. PGM input selection buttons 51 constitute a button group including seven buttons to select the above-described PGM input (video before switching) out of total seven systems that are video signals ("1" through "6") input into the three input units 1 shown in FIG. 2 each having two channels and still image data ("INT") generated within the video switcher 100.

NEXT input selection buttons 52 constitute a button group including seven buttons to select the above-described NEXT input (video after switching) out of total seven systems that are the video signals of six systems ("1" through "6") input into the three input units 1 and the above-described still image data ("INT").

A CUT button 53 gives an instruction to switch the cuts. A transition lever 54 manually adjust a ratio of the present video to the next video on the screen, when executing dissolves, wipes, and the like.

A button 55 gives an instruction to record materials and PGM signals in the external HDD (for example, HDD 102 in FIG. 1). In addition, when giving the instruction to start recording, the button 55 also serves as a button to give an instruction to prepare a switching list (called EDL) representing information indicating contents of operation with the PGM input selection buttons 51, NEXT input selection buttons 52, CUT button 53, and transition lever 54. Further, when giving the instruction to end the recording, the button 55 also serves as a button to give an instruction to end the preparation of the EDL.

It should be noted that, although not illustrated in the figure, the panel unit 3 also performs the following operations [a] through [c] as the operations related to embodiments of the present invention other than the operations using the buttons and the like shown in FIG. 3.

[a] Preset operation of setting an initial value of the time code (setting current time or setting arbitrary time) generated by the TC generator 23 in the effect unit 2 shown in FIG. 2.

[b] Format setting operation of setting the time code generated by the TC generator 23 to either SMPTE that is a time code corresponding to video signals of NTSC format or EBU that is a time code corresponding to video signals of PAL format.

[c] Recording video signal selection operation of selecting any one of the PGM signals, materials asynchronous with the system, and materials synchronous with the system as the video signals recorded in the external HDD by the operation of the button 55.

The CPU in the panel unit 3 sends a command indicating contents of the operation on the panel unit 3 to the CPU in the main control unit 4 shown in FIG. 2. The CPU in the main control unit 4 sends a command to control the selector 14, selector 15, and AVI file conversion unit 17 to the CPU in each of the input units 1; and sends a command to control the effect circuit 21 to the CPU in the effect unit 2 based on the command supplied from the panel unit 3.

In addition, the CPU in the main control unit 4 performs processing of sending the preset value of the time code to the TC generator 23 in the effect unit 2, and processing of preparing the switching list (EDL) by using the time code generated by the TC generator 23 as the processing related to the embodiment of the present invention. As shown in FIG. 2, the above-described processing is illustrated as processing blocks including a TC (Time Code) preset unit 41, a TC correction unit 42 and an EDL generation unit 43.

[Video Signal Processing]

Next, video signal processing in the video switcher 100 is described. The A/D and S/P conversion circuit 11 performs digital conversion on analogue video signals (composite signals and S-video) of respective channels input into the input unit 1, and the A/D and S/P conversion circuit 11 performs parallel conversion on digital video signals of serial transmission standard (SDI: Serial Digital Interface, and the like) of respective channels input into the input unit 1. Then, the frame synchronizer 12 synchronizes the converted input video signals with reference synchronization signals in the video switcher 100 (hereinafter, described as "synchronous with the system"), and afterward the picture size conversion circuit 13 converts the synchronous video signals into horizontal 1,280×vertical 1,024 pixels, which is a uniform picture size of the video switcher 100, to be sent to the selector 14.

The selector 14 performs a selection operation in accordance with the operations of the PGM input selection buttons 51 and the NEXT input selection buttons 52 in the panel unit 3 (FIG. 3). Subsequently, the PGM input and NEXT input selected using those buttons are supplied to the effect circuit 21 in the effect unit 2.

The effect circuit 21 performs switching processing of cuts, dissolves, wipes and the like on the supplied PGM input and NEXT input in accordance with the operations of the button 53 and transition lever 54 on the panel unit 3 (FIG. 3), and generates the PGM signals. The PGM signals generated by the effect circuit 21 are converted into analogue signals in the D/A conversion circuit 22, and the converted analogue signals are output to an external image display apparatus or the like and also returned to the input units 1.

The selector 15 in each of the input units 1 selects the PGM signals returned from the effect unit 2, materials (not genlocked, and asynchronous with the system) at a stage prior to the frame synchronizer 12, or materials (synchronous with the system) at a stage subsequent to the frame synchronizer 12 in accordance with the above-described recording video signal selection operation in the panel unit 3. The DV encoder 16 converts the video signals selected by the selector 15 into compressed video signals of DV (Digital Video) standard, and afterward, the AVI file conversion unit 17 converts the compressed video signals along with audio signals supplied from an audio signal processing system (not illustrated) into an AVI file, and records the resultant AVI file in the external HDD based on the recording instruction supplied using the button 55 in the panel unit 3 (FIG. 3).

[Time Code Processing]

Next, time code processing in the video switcher 100 is described. When the panel unit 3 performs the preset operation of setting the initial value of the time code as described above, the CPU in the panel unit 3 sends a command indicating contents of the operation to the CPU in the main control unit 4.

The TC preset unit 41 in the main control unit 4 sends signals indicating the initial value set by the preset operation to the TC generator 23 in the effect unit 2 based on the command. The TC generator 23 increments the initial value by one frame of a frame frequency based on the reference synchronization signals in the video switcher 100 (hereinafter, described as "frame frequency of the system"), thereby generating in a free-run mode the time code (SMPTE or EBU) set by the above-described format setting operation in the panel unit 3. The time code generated by the TC generator 23 is called a system TC in the following description.

The TC multiplexer 24 superimposes the system TC on a blanking period (for example, fourth line) of the PGM signals returned to respective input units 1 from the effect circuit 21.

The TC demultiplexer 18 in each of the input units 1 extracts the system TC from the PGM signals. Subsequently, the TC adding unit 19 executes time code processing as described in FIGS. 4 to 6 using the extracted system TC, thereby writing the time code in a sub-code area of the compressed video signals of DV standard converted by the DV encoder 16.

FIG. 4 shows the processing in the case where the PGM signals are selected by the selector 15 in the input unit 1 (in other words, in the case where the PGM signals are selected by the recording video signal selection operation on the panel unit 3), and the processing is started at each frame of the frame frequency of the system. The system TC extracted by the TC demultiplexer 18 from the PGM signals (step S1) is read, and the read system TC is directly written in the sub-code area of the compressed video signals converted by the DV encoder 16 (step S2), and the processing ends.

FIG. 5 shows the processing in the case where the materials asynchronous with the system at the stage prior to the frame synchronizer 12 are selected by the selector 15 in the input unit 1 (in other words, in the case where the materials asynchronous with the system are selected by the recording video signal selection operation on the panel unit 3), and the processing is started at each frame of the input video signals. First, it is judged whether the above-described preset operation has been performed on the panel unit 3 or whether a state of no video signal input into the input unit 1 has changed to a state of the video signals input into the input unit 1 (step S11).

If the judgment is Yes, the system TC extracted from the PGM signals by the TC demultiplexer 18 is read (step S12). Subsequently, it is judged whether the format (NTSC or PAL) of the present video signals input into the input unit 1 matches the format corresponding to the system TC (SMPTE or EBU) set by the format setting operation on the panel unit 3) (step S13).

If the judgment is No, the value of the system TC read at step S12 is converted into the value of the time code corresponding to the format of the presently input video signals (from the SMPTE value to the EBU value, or from the EBU value to the SMPTE value) (step S14). Subsequently, the process proceeds to step S15. On the other hand, if the judgment is Yes at step S13, the process proceeds directly to step S15.

The value corresponding to the delay (two frames as described above) in the effect circuit 21 within the effect unit 2 is added to the value of the system TC (the value of the converted system TC if the processing having proceeded through step S14) in order to generate the time code added to the material (hereinafter, referred to as a material time code) by the software processing (step S15).

Subsequently, the result of the addition is set as the initial value of the material time code (step S16) written in the sub-code area of the compressed video signals converted by the DV encoder 16 (step S17), and the processing ends.

If the judgment is No at step S11, one frame is added to the value of the material time code written at step S17 in the processing performed on the frame immediately before (step S18). Subsequently, a value after the addition of one frame is written in the sub-code area of the compressed video signals converted by the DV encoder 16 (step S17), and the processing ends.

Figure 6:
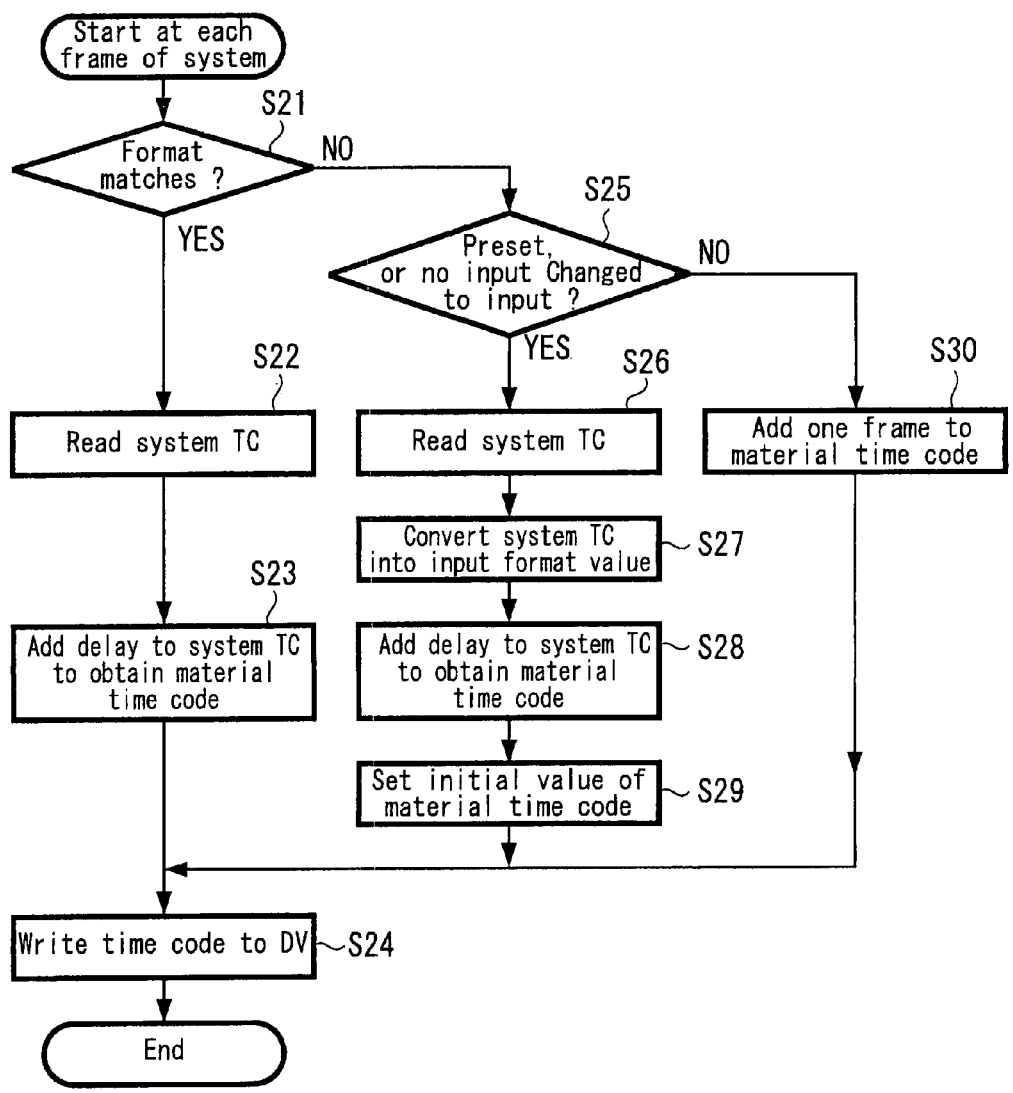
FIG. 6 is a flow chart showing the time code processing performed by the TC adding unit in the input unit of the video switcher shown in FIG. 1.

FIG. 6 shows the processing in the case where the materials synchronous with the system at the stage subsequent to the frame synchronizer 12 are selected by the selector 15 in the input unit 1 (in other words, in the case where the materials synchronous with the system are selected by the recording video signal selection operation on the panel unit 3), and the processing is started at each frame of the frame frequency of the system. Subsequently, it is judged whether the format (NTSC or PAL) of the present video signals input into the input unit 1 matches the format corresponding to the system TC (SMPTE or EBU) (step S21).

If the judgment is Yes, the system TC extracted from the PGM signals by the TC demultiplexer 18 is read (step S22). Subsequently, the value obtained by adding the value corresponding to the delay (two frames) in the effect circuit 21 within the effect unit 2 to the value of the read system TC is set as the value of the material time code (step S23). Subsequently, the newly set value of the material time code is written in the sub-code area of the compressed video signals converted by the DV encoder 16 (step S24), and the processing ends.

If the judgment is No at step S21, it is judged whether the above-described preset operation is performed on the panel unit 3 or whether a state of no video signal input into the input unit 1 is changed to a state of the video signals input into the input unit 1 (step S25).

If the judgment is Yes, the system TC extracted from the PGM signals by the FC demultiplexer 18 is read (step S26). Subsequently, the value of the read system TC is converted into the value of the time code corresponding to the format of the presently input video signals (from the SMPTE value to the EBU value, or from the EBU value to the SMPTE value) (step S27).

Subsequently, the value (two frames) corresponding to the delay in the effect circuit 21 within the effect unit 2 is added to the value of the system TC converted at step S27 in order to generate the material time code by software processing (step S28).

Further, the result of the addition is set as the initial value of the material time code (step S29) written in the sub-code area of the compressed video signals converted by the DV encoder 16 (step S24), and the processing ends.

If the judgment is No at step S25, one frame is added to the value of the material time code written at step S24 in the processing on the frame immediately before (step S30). Subsequently, a value after the addition of one frame is written in the sub-code area of the compressed video signals converted by the DV encoder 16 (step S24), and the processing ends.

According to the processing described in FIGS. 4 to 6, a time code is added to any of the video signals of the PGM signals, materials asynchronous with the system, and the materials synchronous with the system recorded in the external HDD as the AV file.

Figure 7:
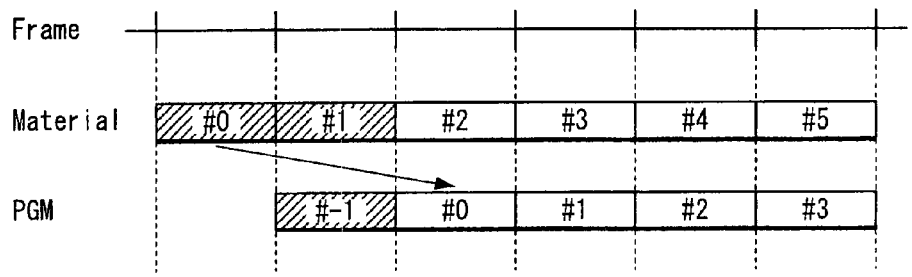
FIG. 7 is a diagram showing a relationship between a time code when starting recording of materials and a time code when starting recording of PGM signals.

FIG. 7 shows a relationship between the time code when starting the recording in the case where the materials synchronous with the system are recorded as the AV file (the time code added at steps S21 through S24 in the processing shown in FIG. 6) and the time code when starting the recording in the case where the PGM signals are recorded as the AV file (the time code added by the processing shown in FIG. 4).

The value of the time code added to the materials corresponds to the value of the time code (system TC) added to the PGM signals after two frames, that is, the delay time in the effect circuit 21. Therefore, the materials and PGM signals are mutually synchronous on a time axis.

[EDL Processing]

Next, processing on the switching list (EDL) in the video switcher 100 is described. As shown in FIG. 2, the system TC generated by the TC generator 23 in the effect unit 2 is also sent to the TC correction unit 42 in the main control unit 4.

The TC correction unit 42 adds a value, corresponding to a required time after the operation using the PGM input selection buttons 51, the NEXT input selection buttons 52, CUT button 53, and transition lever 54 on the panel unit 3 and before the start of the switching processing performed by the effect circuit 21 in the effect unit 2 based on the operation of those buttons and lever, to the value of the system TC. The required time has been determined in advance, representing the time corresponding to one frame, for example. Subsequently, the system TC thus corrected is sent to the EDL generation unit 43.

When recording the video signals in the external HDD, the EDL generation unit 43 prepares a switching list (EDL) based on the operation of the button 55 on the panel unit 3 by using the corrected system TC as time information (FIG. 3). The switching list (EDL) represents information indicating contents of the operation of the PGM input selection buttons 51, NEXT input selection buttons 52, CUT button 53, and transition lever 54 (FIG. 3). Then, the prepared EDL is recorded in the recording device such as a small memory card (recording device 103 in FIG. 1) inserted in the slot (not illustrated) provided in the video switcher 100.

Figure 8:
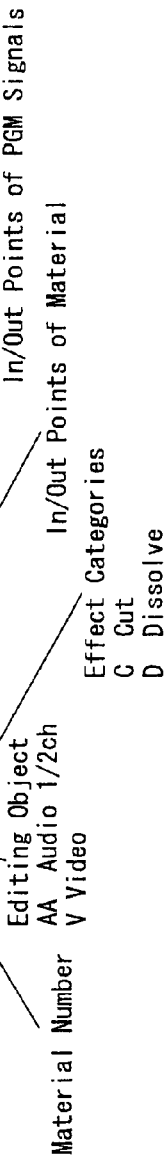
FIG. 8 is a diagram illustrating a relationship between an operation performed on the panel unit and a switching list prepared.

FIG. 8 illustrates a relationship between the operation on the panel unit 3 and the EDL prepared by the EDL generation unit 43. The preparation of the EDL starts in accordance with the instruction to start the recording by the operation of the button 55 on the panel unit 3, as shown with numeral 1 on the left side of this figure.

After starting the preparation of the EDL, "1" (FIG. 3) is selected among the PGM input selection buttons 51, as shown with numeral 2 on the left side of the figure, and afterward "3" is selected among the PGM input selection buttons 51 after switching, as shown with numeral 3 on the left side of the figure. Subsequently, a list having a serial number "001" appended to the left end is prepared for the material "1" selected by the PGM input selection buttons 51 as shown in the first and second lines from the top of a column on the right side of the figure.

The contents of each item of the list are shown on the lower side of the figure. Number "001" on the right side of the serial number "001" is a material number indicating the material "1" selected by the PGM input selection buttons 51, and an item shown on the right side thereof represents an editing object (here, audio signals of two channels indicated as AA and video signals indicated as V).

An item shown on the right side of the editing object represents effect categories (here, the category is the cut indicated as C since the operation is the switching in the selecting operations performed using the PGM input selection buttons 51, and D is indicated if the effect is dissolve, for example).

An item shown on the right side of the effect categories represents a time code indicating the in-point and out-point of the material "1" selected by the PMG input selection buttons 51, and an item on the right side thereof is the time code indicating the in-point and out-point of a portion of the material "1" regarding the PGM signals. The system TC corrected by the TC correction unit 42 (FIG. 2) is used as the time code.

An item after mark * represents a AVI file name of the material "1" selected by the PGM input selection buttons 51.

After the selection by the PGM input selection buttons 51 is switched to "3", upon sequentially performing operations as shown with numerals 4 through 7 on the left side of the figure, similar lists as shown in the third line from the top of the column and further below on the right side of the figure are sequentially prepared for each of the materials selected by the PGM input selection buttons 51 and NEXT input selection buttons 52 in accordance with contents of the operation using the CUT button 53 and transition lever 54.

Subsequently, the preparation of the EDL ends in accordance with the instruction to end the recording from the button 55 on the panel unit 3, as shown with numeral 8 on the left side of the figure. Accordingly, the prepared EDL is recorded in the recording device such as the small memory card as described above.

[Advantages of Video Switcher According to Embodiments of the Present Invention]

Next, advantages obtained by using the video switcher 100 as described above are explained.

According to the video switcher 100, the system TC generated by the single TC generator 23 within the video switcher 100 is directly added to the PGM signals generated by the effect circuit 21 (processing performed by the TC adding unit 19 shown in FIG. 4), and are added to the input video signals (materials) in consideration of the processing delay time in the effect circuit 21 (processing steps S21 through S24 in FIG. 6 performed by the TC adding unit 19). Therefore, the materials or PGM signals can be recorded in the external HDD (HDD 102 in FIG. 1) after adding the mutually synchronous time codes to materials and the PGM signals as shown in FIG. 7 without inputting the time codes from the outside of the video switcher 100.

Further, as illustrated in FIG. 8, the switching list (EDL) representing information indicating the contents of switching operation when generating the PGM signals is prepared by using the above-described system TC as time information, when the video signals are recorded in the external HDD. Accordingly, the materials recorded in the HDD and the EDL are linked using the same time code.

Therefore, the non-linear editing apparatus 104 shown in FIG. 1 performs editing of a minor adjustment on the switching timing indicated by the EDL instead of editing the material recorded in the HDD from scratch, and therefore, materials and the PGM signals are mutually synchronous on the time axis and preprocessing such as positioning becomes unnecessary, thereby performing editing operation efficiently.

In addition, the time code is generated for the input video signals asynchronous with the system, such that the value obtained by adding a value corresponding to the processing delay time in the effect circuit 21 to a value of the system TC is set as the initial value and the initial value increments by one frame of the input video signals (processing steps S11, S12, S15 to S17, and S18 shown in FIG. 5 performed by the TC adding unit 19). Therefore, the time code can be added to the input video signals asynchronous with the system.

Further, in the case where the format of the input video signals differs from the format corresponding to the system TC, the value of the system TC is converted into the value of the time code according to the standard corresponding to the format of the input video signals. The value obtained by adding the value corresponding to the processing delay time in the effect circuit 21 to the converted value of the time code is set to the initial value, and the time code incrementing the initial value by one frame of the input video signals is generated (processing steps S13, S14, S15 to S17, and S18 shown in FIG. 5 and processing steps S25 to S30 shown in FIG. 6 performed by the TC adding unit 19). Therefore, the time code can be added to the input video signals having the format differing from the format corresponding to the system TC.

Modified examples and alteration effected to the embodiment described above, and apparatuses to which an embodiment of the present invention is applicable are described below.

According to the embodiment described above, one kind of time code (one of SMPTE and EBU) set by the format setting operation on the panel unit 3 is generated as the system TC by the TC generator 23, and the value of the system TC is converted into the value of the time code corresponding to the format of the input video signals in the case where the format (NTSC or PAL) of the present input video signals does not match the format corresponding to the system TC (processing steps S13 and S14 shown in FIG. 5, and processing steps S21 and S25 to S30 shown in FIG. 6). However, according to another embodiment of the present invention, both the system TCs of SMPTE and EBU may be generated by the TC generator 23, and the time code corresponding to the format of the present input video signals is added to the video signals. Processing steps S13 and S14 in FIG. 5, and processing steps S21 and S25 to S30 in FIG. 6 may be omitted in such case.

According to the embodiment described above, materials and PGMs are recorded in the external HDD of the video switcher 100, however, the video switcher 100 itself may incorporate a storage of large capacity such as HDD, where the materials and PGMs are recorded.

According to the embodiment described above, editing is performed using the non-linear editing apparatus 104 provided separately from the video switcher 100, however, a non-linear editing function may be included in the video switcher 100.

According to the embodiment described above, the embodiment of the present invention is applied to the video switcher, however, an embodiment of the present invention can be applied to all kinds of video processing apparatuses including an editing apparatus, other than the video switcher, to which video signals of a plurality of systems are input, and processing is performed on the input video signals of two or more systems to generate processed video signals.

It should be understood by those skilled in the art that various modifications, combinations, sub-combinations and alterations may occur depending on design requirements and other factors insofar as they are within the scope of the appended claims or the equivalents thereof.

What is claimed is:

1. A video switcher apparatus having no time code input terminal, comprising:
    input means for inputting first video signals of moving images from a plurality of moving image video capture systems which do not have a time code output function;
    processing means for video effect processing the first video signals of two or more video capture systems input into said input means and generating video effect processed second video signals having effects such as at least dissolves and wipes;
    time code generating means for generating a first time code based only on a preset value independent of external time code input; and
    time code adding means for (a) adding the first time code generated by said time code generating means to the video effect processed second video signals generated by said processing means, and (b) adding a second time code to the first video signals which is input into said input means, the second time code is obtained by adding a value corresponding to video effect processing delay time at said processing means to a value of the first time code generated by said time code generating means, wherein said first and second time codes are mutually synchronous.

2. A video switcher apparatus according to claim 1, further comprising:
    recording means for recording the video signals with the second time code added by said time code adding means in a recording medium.

3. A video switcher apparatus according to claim 1, further comprising:
    synchronization control means for synchronizing the video signals input into said input means with reference synchronization signals within the apparatus, wherein
    said time code adding means acquires an initial value with respect to the input video signals asynchronous with said reference synchronization signals by adding the value corresponding to video effect processing delay time at said processing means to the value of the first time code generated by said time code generating means, generating the second time code incrementing the initial value by one frame of the input video signals, and adding the second time code to the asynchronous input video signals.

4. A video switcher apparatus according to claim 1, wherein:
    said time code generating means generates the first time code according to a standard corresponding to video signals of a specific format; and
    said time code adding means converts the value of the first time code generated by said time code generating means into the value of the first time code according to the standard corresponding to the format of the input video signals in the case of the format of the video signals input into said input means differing from said specific format, acquiring an initial value by adding the value corresponding to video effect processing delay time in said processing means to the value of the converted time code, generating the second time code incrementing the initial value by one frame of the input video signals, and adding the second time code to the input video signals.

5. A video switcher apparatus according to claim 1, wherein:
    said processing means performs switching between the video signals of two video capture systems and generates video effect processed video signals; and
    operating means for instructing said processing means to perform switching and
    switching list preparing means for preparing a switching list representing information indicating operation contents of said operating means by using the first time code generated by said time code generating means as time information are further included.

6. A video switcher apparatus according to claim 5, further comprising:
    time code correcting means for adding the value corresponding to time after performing the operation at said operating means and before starting the switching at said processing means to the value of the first time code generated by said time code generating means, wherein said switching list preparing means uses the time code corrected by said time code correcting means as the time information.

7. A method of adding a time code by a video switcher apparatus having no time code input terminal, comprising the steps of:
   inputting first video signals of moving images from a plurality of moving image video capture systems which do not have a time code output function;
   video effect processing said input first video signals of two or more video capture systems and generating video effect processed second video signals having effects such as at least dissolves and wipes;
   generating a first time code based on a preset value independent of external time code input; and
   adding said generated first time code to said video effect processed second video signals, and adding a second time code to said input first video signals, the second time code is obtained by adding a value corresponding to video effect processing delay time due to said video effect processing to a value of said generated first time code, wherein said first and second time codes are mutually synchronous.

8. A method of adding a time code according to claim 7, further comprising the step of:
   recording the video signals with said second time code added thereto in a recording medium.

9. A method of preparing an editing list by a video switcher apparatus having no time code input terminal, comprising the steps of:
   inputting first video signals of moving images from a plurality of moving image video capture systems which do not have a time code output function;
   video effect processing said input first video signals of two or more video capture systems and generating video effect processed second video signals having effects such as at least dissolves and wipes;
   generating a first time ode based only on a preset value independent of external time code inset;
   adding said generated first time code to said video effect processed second video signals, and adding a second time code to said input first video signals, the second time code is obtained by adding a value corresponding to video effect processing delay time due to said video effect processing to a value of said generated time code, wherein said first and second time codes are mutually synchronous;
   instructing operation on said processing; and
   preparing an editing list representing information indicating contents of said operation by using said generated first time code as time information.

10. A method of preparing an editing list according to claim 9, further comprising the step of:
   recording said editing.

11. A method of preparing an editing list according to claim 9, wherein said processing is switching processing.

12. A video switcher apparatus having no time code input terminal, comprising:
   an inputter inputting first video signals of moving images from a plurality of moving image video capture systems which do not have a time code output function;
   a video effect processor processing the first video signals of two or more video capture systems input into said inputter and generating video effect processed second video signals having effects such as at least dissolves and wipes;
   a time code generator generating a first time code based only on a preset value independent of external time code input; and
   a time code adder adding the first time code generated by said time code generator to the video effect processed second video signals generated by said video effect processor, and adding a second time code to the first video signals which is input into said inputter, the second time code is obtained by adding a value corresponding to video effect processing delay time at said video effect processor to a value of the first time code generated by said time code generator, wherein said first and second time codes are mutually synchronous.

* * * * *